United States Patent [19]

Whitchurch

[11] 4,172,870
[45] Oct. 30, 1979

[54] METHOD FOR PERMITTING RELEASE OF MOLDED ARTICLES IN THE ABSENCE OF A RELEASE AGENT OTHER THAN A COATING OF ZERO GRAIN SOFT WATER ON THE MOLD

[75] Inventor: William E. Whitchurch, Des Plaines, Ill.

[73] Assignee: Millmaster Onyx Corporation, New York, N.Y.

[21] Appl. No.: 557,581

[22] Filed: Mar. 12, 1975

Related U.S. Application Data

[63] Continuation-in-part of Ser. No. 404,220, Oct. 9, 1973, abandoned.

[51] Int. Cl.$^2$ .................. B29D 27/04; B28B 7/36; B29C 1/04
[52] U.S. Cl. ............................. 264/51; 106/38.22; 156/289; 249/115; 264/213; 264/299; 264/300; 264/331; 264/338; 264/DIG. 77
[58] Field of Search ................. 264/48, 54, DIG. 14, 264/DIG. 18, 338, 46.2, 213, 51, 299, 300, 331, DIG. 77; 249/115; 156/289; 106/38.22

[56] References Cited

U.S. PATENT DOCUMENTS

| 2,119,727 | 6/1938 | Talbot ................................. 264/213 |
|---|---|---|
| 3,000,757 | 9/1961 | Johnston et al. .......... 260/2.5 BD X |
| 3,026,572 | 3/1962 | Reick .................................. 249/115 X |
| 3,085,896 | 4/1963 | Britt et al. .................. 260/2.5 BD X |
| 3,215,581 | 11/1965 | Carlson et al. .................. 264/46.2 X |
| 3,468,991 | 9/1969 | Krug .................................. 264/54 X |
| 3,607,540 | 9/1971 | Hoogstoel ........................... 156/289 |
| 3,694,530 | 9/1972 | Wolfe ................................. 264/338 X |
| 3,726,952 | 4/1973 | Boden et al. ...................... 264/300 X |
| 3,801,687 | 4/1974 | Cobbledick ........................... 264/54 |
| 3,819,793 | 6/1974 | Elliott ................................. 264/213 |
| 3,823,099 | 7/1974 | Doyle ........................... 260/2.5 N X |
| 3,830,760 | 8/1974 | Bengtson ....................... 260/2.5 BD |
| 3,925,527 | 12/1975 | Kleimann et al. ............... 264/300 X |

FOREIGN PATENT DOCUMENTS 664192  6/1963  Canada .................................... 264/54

OTHER PUBLICATIONS

Sharpe, Louis H., and Harold Schonhorn, "Surface Energetics, Adhesion, and Adhesive Joints," in *Contact Angle, Wettability, and Adhesion*, the Kendall Award Symposium honoring William A. Zisman, sponsored by the Division of Colloid and Surface Chemistry at the 144th Meeting of the American Chemical Society, Los Angeles, Calif., Apr. 2-3, 1963, Washington, D. C., American Chemical Society, 1964, pp. 189–201.

Ferrigno, T. H., *Rigid Plastics Foams*, New York, Reinhold, ©1963, pp. 3, 4, 42–46.

Bender, Rene J., *Handbook of Foamed Plastics*, Libertyville, Ill., Lake Publishing Corp., ©1965, pp. 125, 135, 137, 138, 176, 185–188, 197, 207.

Brydson, J. A., "Plastics Material," Princeton, N.J., D. Van Nostrand, ©1966, pp. 489–494.

Billmeyer, Fred W., "Textbook of Polymer Science," Second Edition, New York, Wiley-Interscience, ©1971, pp. 255–258.

Wyandotte Bulletin: "Technical Data on Quadrol," Wyandotte, Mich., Wyandotte Chemicals Corp., Dec. 1, 1959, pp. 1–6.

Union Carbide Publication: "1971 Edition Chemicals and Plastics Physical Properties," (1971), pp. 7, 17, 22, 23.

*Primary Examiner*—Philip Anderson
*Attorney, Agent, or Firm*—Arthur A. Jacobs

[57] ABSTRACT

A method of releasing molded articles from a mold by coating the mold with zero grain soft water prior to insertion of the material to be molded into the mold, zero grain soft water meaning the substantially total absence of divalent ions, such as calcium or magnesium, in the water.

7 Claims, 2 Drawing Figures

METHOD FOR PERMITTING RELEASE OF MOLDED ARTICLES IN THE ABSENCE OF A RELEASE AGENT OTHER THAN A COATING OF ZERO GRAIN SOFT WATER ON THE MOLD

This is a continuation-in-part of co-pending application Ser. No. 404,220, filed Oct. 9, 1973 and now abandoned.

This invention relates to the production of foamed articles, and it particularly relates to the production of sheets or panels utilizable as roofing material or the like, made of a resin foam such as polyurethane or the like.

Foamed articles of the aforesaid type are generally made by pouring a liquid foamable resin mix (generally, an aqueous composition which includes a foaming agent), between an upper and a lower backing sheet within a mold. The mix is poured into the mold below the curing temperature of the mix, after which a predetermined amount of heat is applied to vaporize the foaming agent, causing expansion of the mix. Thereafter, additional heat is applied to cure the mix between the backing sheets to form a rigid sheet or panel.

An efficient method of producing foamed articles in the above manner comprises pouring the mix between the backing sheets which are carried by two endless belt-type conveyors vertically spaced from each other, the lower flight of the upper conveyor and the upper flight of the lower conveyor forming a mold cavity between them. The two conveyors are preferably formed of a plurality of metal plates or links hinged to each other so as to permit movement around respective drive and idler rollers.

The plates of the lower conveyor are, additionally, provided with upstanding blocks or "dams" which act as end plates to define the sides of the mold cavity between the conveyors. As the conveyors, and the mix held between the upper and lower backing sheets in the mold cavity move from the feed area where the mix is inserted, they carry the sandwiched mix first through the preheating stage and then through the final heating or curing stage, so that when the sandwiched mix reaches the opposite end, the cured and finished sheet is discharged at that end at the same time that additional backing sheets and mix are being inserted at the other end. This type of apparatus, utilizing what is, in effect, a continuously moving mold, is more fully disclosed in U.S. Pat. No. 3,215,581, dated Nov. 2, 1965, which is hereby incorporated by reference. This same patent also discloses that the uncured liquid foamable resin mix utilized as the moldable material may be any of the suitable well-known liquid foamable mixes which are foamable to a rigid foam, although the polyurethane type foamable materials are preferred because of their adhesive properties which give an excellant bond between the foam and backing material without the use of extraneous adhesives. Particular examples of the foamable composition are set forth in in the aforesaid patent and, since they form no part of the present invention, per se, they need not here be described in detail.

This moldable composition is applied between two backing sheets and adhered thereto within the mold. The backing sheets may be of any of the standard materials used in this art, as, for example, paper, plastic film or sheet, aluminum sheet material, wood veneer, steel sheet material, tissue-backed aluminum foil, or the like.

Although, as indicated above, the aforesaid apparatus is highly efficient for its purpose, it is subject to the same problem of adhesion of the finished product to the mold, as is generally the case with all molds, except that the problem here is even more acute because the continuous discharge of the finished product requires instantaneous release, so as not to interfere with the continuous action of the apparatus.

In conformity with the molding art in general, it has, heretofore, been necessary to utilize release agents with this type of apparatus in order to effectively remove the finished product from the mold. One type of release agent heretofore used has been ordinary hand soap which is applied, in any desired manner, but most efficiently by spraying, into the mold cavity. However, this has created a problem of "build-up" of the soap causing interference with the action of the conveyors. Furthermore, the sprayed soap has acted as a pollutant in the environment causing breathing difficulties for the operators, and is also a pollutant in the finished product. In addition, the soap is relatively expensive, thereby adding considerably to the cost of production.

Another type of release agent heretofore used has been molten wax applied to the belt-type conveyors, as described in the aforesaid patent incorporated herein by reference. However, this required the provision of sufficient heat to keep the wax in a liquid state, such heat usually requiring the use of an electric heater or the like. Furthermore, the wax was expensive and troublesome to apply.

It is an object of the present invention to overcome the above difficulties, by providing a process which eliminates the necessity of using wax, soap or any other similar release agent, while yet obtaining effective release of the product from the mold cavity.

Another object of the present invention is to provide a process of the aforesaid type which significantly reduces pollution of both the product and the environment and which also significantly reduces the cost of production.

Other objects and many of the attendant advantages of this invention will be readily appreciated as the same becomes better understood by reference to the following description when read in conjunction with the accompanying drawings wherein.

Figure 1:
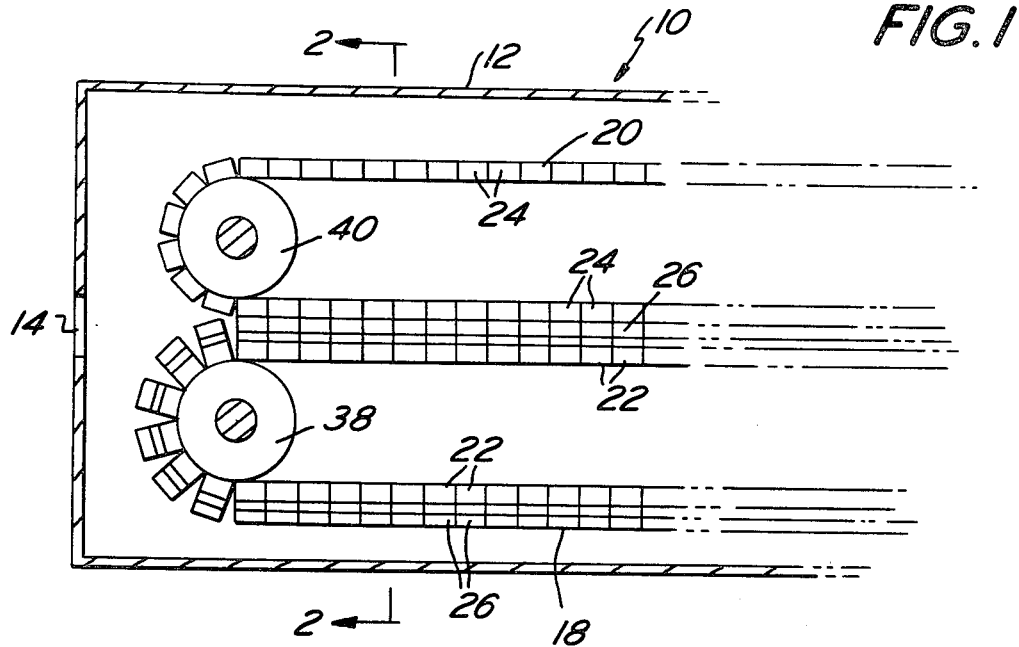
FIG. 1 is a fragmentary sectional view of the outlet end of a conveyor mold apparatus wherein a mold release process embodying the present invention is utilized.
Figure 2:
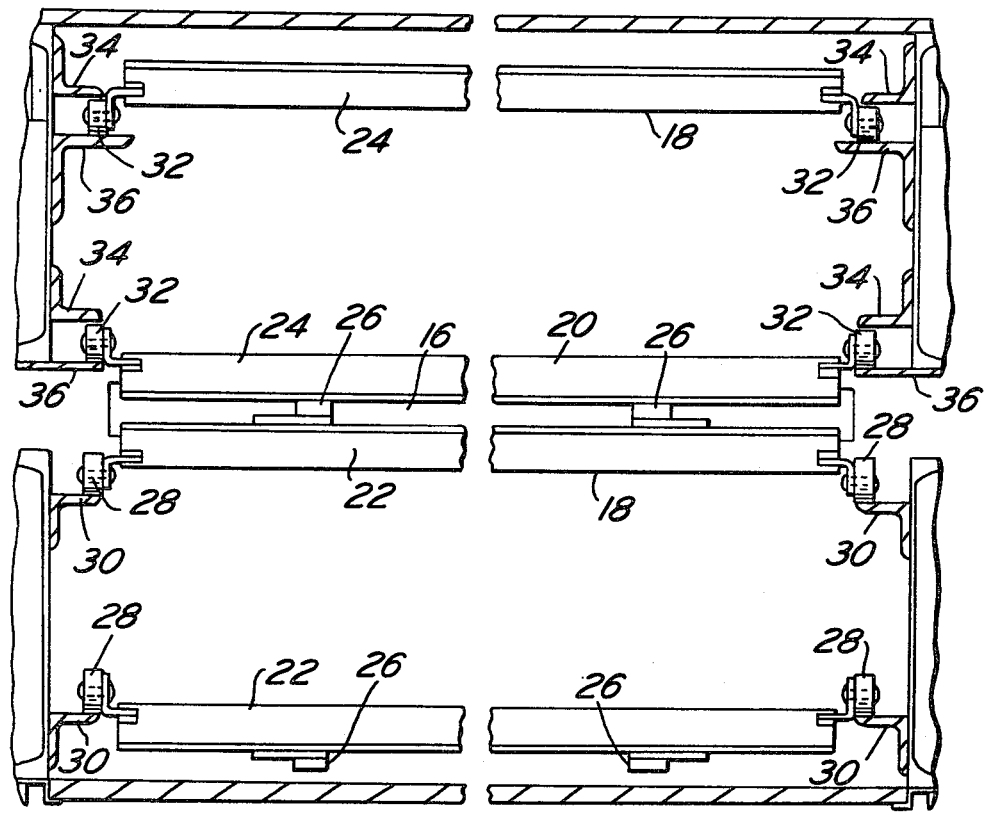
FIG. 2 is a sectional view taken on line 2—2 of FIG. 1.

Referring in greater detail to the drawings wherein similar reference characters refer to similar parts, there is shown the end portion of an apparatus identical to that more fully disclosed in the aforesaid U.S. Pat. No. 3,215,581. This apparatus is here generally designated 10 and comprises an elongated housing 12 (only one end of which is shown) having an outlet aperture 14 in line with the mold cavity 16 (see FIG. 2) formed between the upper flight of a lower conveyor 18 and the lower flight of an upper conveyor 20. The finished product in the form of a continuous sheet leaves the apparatus and is extruded through the outlet aperture 14.

The lower conveyor is formed of a plurality of hinged plates 22 while the upper conveyor is formed of a plurality of similar hinged plates 24. Each plate 22 of the lower conveyor 18 carries a pair of upstanding blocks or "dams" 26 which, when bearing against a corresponding plate 24 on the upper conveyor 20, form end plates defining the sides of the mold cavity.

The plates 22 of the lower conveyor are each provided with a roller 28 on each end which runs on corresponding tracks 30, while the plates 24 of the upper conveyor are each provided with a roller 32 on each end, these rollers running between upper and lower tracks 34 and 36. Drive rollers 38 and 40 are provided for the respective conveyors 18 and 20, idler rollers being provided at the opposite ends (not shown). Also not shown are the means for applying the foam composition and the preliminary and final or curing heating means. However, these are the same as disclosed in the aforesaid U.S. Pat. No. 3,215,581.

In the parent application, the zero grain soft water was incorporated into the moldable composition to act as a release agent when the foamable compound seeps from between the backing material, this procedure being used instead of the molten wax described in the aforesaid U.S. Pat. No. 3,215,581. However, the use of zero grain water in the composition itself does not provide sufficiently satisfactory results, perhaps because of the interference of the other components of the composition, and, in accordance with the present invention, it has been found that the application of the zero grain soft water, by itself, to the mold surfaces either by spraying or other application, gives the most satisfactory results. Accordingly, the zero grain soft water is sprayed onto the interior walls of the mold cavity 16 formed by the upper flight of conveyor 18 and the lower flight of the conveyor 20, this application being made prior to the deposition of the moldable composition in the mold. The term zero grain soft water, as used herein, means the substantially total absence of divalent ions in the water. This is accomplished by replacement of the divalent ions, such as calcium, magnesium, and the like, which are usually associated with water hardness, by monovalent ions such as sodium or the like.

The softening of the water may be effected in a number of different ways. One of the common methods is by the passage of the raw water through a bed of the $Na^+$ form of a strongly acid ion-exchange resin. Among such ion-exchange resins are sulfonated polymers containing aromatic moieties such as sulfonated styrene and divinyl benzene polymers. In this process, the sodium ion is displaced from the resin by calcium, magnesium and similar ions in the water. The resin is regenerated to the sodium form by flushing the bed with a regeneration fluid such as sodium chloride solution.

The raw water may be softened in a separate process, after which it is added to the mix, or the ion-exchange resin may be situated in a chamber in fluid connection with the mixing tank so that the water, as it passes from the source thereof to the mixing tank, is automatically softened.

Although a specific type of molding apparatus and a specific type of moldable composition have been described above, it is to be understood that these are only for illustrative purposes. The present invention is not concerned with any specific apparatus or with any specific composition, but resides in the use of the zero grain soft water as a release agent.

The invention claimed is:

1. In a method of molding articles from a moldable material within a mold, the improvement which comprises applying a coating of zero grain soft water to the molding surfaces of the mold prior to application of the moldable material into the mold, thereafter molding the moldable material within the mold, and then releasing the molded material from the mold in the absence of any release agent other then said zero grain soft water.

2. The method of claim 1 wherein said moldable material comprises a moldable mixture of a resin capable of condensation polymerization with an isocyanate, a catalyst, a surfactant and a foaming agent.

3. The method of claim 1 wherein the molded material is polyurethane.

4. The method of claim 1 wherein the material to be molded comprises a pair of opposed backing sheets between which is deposited a liquid foamable resin mixture.

5. The method of claim 4 wherein said resin mixture forms a rigid foam between said backing sheets while in the mold.

6. The method of claim 5 wherein said rigid foam is polyurethane.

7. The method of claim 1 wherein said mold comprises a pair of opposed traveling conveyors, the molding surfaces being formed by the opposed surfaces of the conveyors.

* * * * *